(12) United States Patent
Cox et al.

(10) Patent No.: US 12,141,863 B2
(45) Date of Patent: *Nov. 12, 2024

(54) SYSTEMS AND METHODS FOR ONLINE AUTOMOBILE PURCHASING

(71) Applicant: JPMORGAN CHASE BANK, N.A., New York, NY (US)

(72) Inventors: Christine Cox, South Huntington, NY (US); Eric D. Henley, Wilmington, DE (US); Jim J. Manelis, Phoenix, AZ (US); Ramanujam Chari, Dublin, OH (US); Vinay R. Thykkutathil, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,204

(22) Filed: Dec. 14, 2022

(65) Prior Publication Data

US 2024/0078598 A1 Mar. 7, 2024

Related U.S. Application Data

(63) Continuation of application No. 16/974,369, filed on Jun. 14, 2021, now Pat. No. 11,538,104, which is a continuation of application No. 15/921,849, filed on Mar. 15, 2018, now Pat. No. 11,037,237.

(60) Provisional application No. 62/472,127, filed on Mar. 16, 2017.

(51) Int. Cl.
*G06Q 40/03* (2023.01)
*G06Q 30/0207* (2023.01)
*G06Q 30/0601* (2023.01)

(52) U.S. Cl.
CPC ......... *G06Q 40/03* (2023.01); *G06Q 30/0207* (2013.01); *G06Q 30/0641* (2013.01)

(58) Field of Classification Search
CPC ......... G06Q 40/03; G06Q 30/02–0277; G06Q 30/0641
See application file for complete search history.

(56) References Cited

U.S. PATENT DOCUMENTS

| 8,204,788 | B1 * | 6/2012 | Ivankovich | G06Q 30/0601 |
| | | | | 705/26.1 |
| 2012/0233014 | A1 * | 9/2012 | Banks | G06Q 40/02 |
| | | | | 705/26.7 |
| 2014/0164188 | A1 * | 6/2014 | Zabawa | G06Q 30/0625 |
| | | | | 705/26.62 |

FOREIGN PATENT DOCUMENTS

WO WO-2017106043 A1 * 6/2017

OTHER PUBLICATIONS

Jones, R."Online Auto Loans Best Option Automobile Loans." Flixya, Oct. 18, 2007 [ retrievedontheInternetonFeb. 4, 2008 (Year: 2007).*

* cited by examiner

*Primary Examiner* — Raquel Alvarez
(74) *Attorney, Agent, or Firm* — GREENBERG TRAURIG LLP

(57) ABSTRACT

Exemplary embodiments may provide an online automobile purchasing experience for a customer. The experience may be provided by, or associated with, a financial institution. The automobile buying experience may be accessible to both customers of the financial institution as well as non-customers. Customers of the financial institution may receive added benefits during and after the experience.

(Continued)

Non-customers may have the opportunity to become a customer of the financial institution as part of the experience.

20 Claims, 18 Drawing Sheets

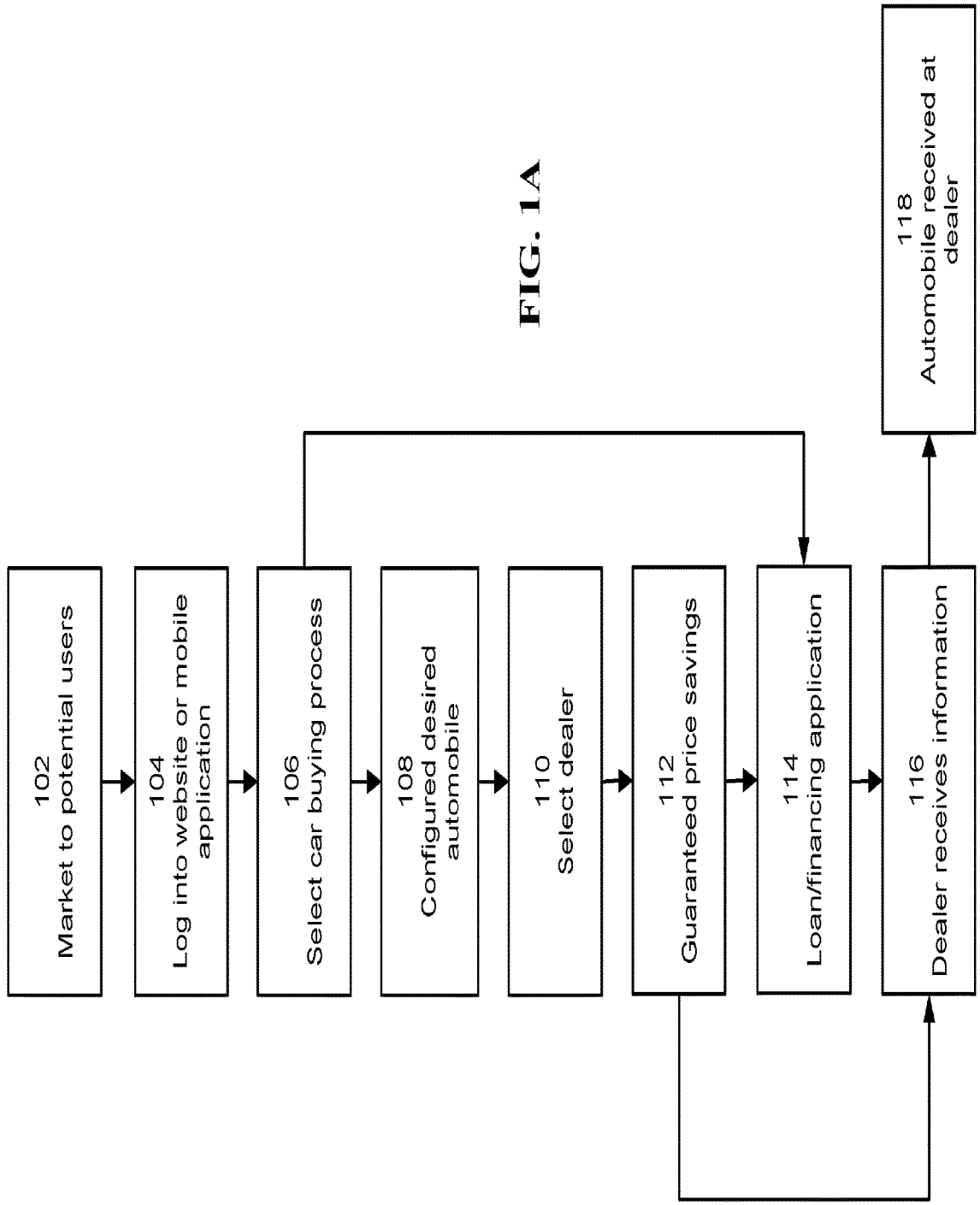

700

Auto Loan Application

50% COMPLETE — 702

706

704

2017
HONDA ACCORD SEDAN
TOURING AUTO

Chase Car Buying Service Details ⓘ
MSRP $35,665
TrueCar estimate $34,056
Estimated savings off MSRP $1,743

SCOTT HONDA OF WEST CHESTER
700 W Town Rd 706 Auto Park Blvd
West Chester, Pennsylvania 19382
877-392-3541

Good Afternoon. Ready to buy a car?
Thanks for using our Car Buying Service. Now that you've chosen your Car and dealer, we only need a few additional details to complete your Application.

Your car
Details of the car you plan to purchase

Your dealer
Dealership where your car is located

Your loan
Amount and term of your loan

Auto Loan Application

▷ Getting started ✓

▽ Your information

20% Complete

Does everything look OK?
To save you time, we've filled out some of your application for you

[Edit] ——— 816 Edit

| Name | John M. Smith |
| Address | 1378 Main Street |
| | San Francisco, CA 94122 |
| Phone number | 415-583-3840 |
| Email address | johnsmith@gmail.com |

For your security, we're not displaying your social security number and date of birth but we'll use this information for your credit decision

[Next]

▷ Your car
▷ Your dealer
▷ Your loan
▷ Your finances

Name: John M. Smith
If you have to make edits to the....

Address ⓘ [1378 Main Street]
Address 02 (optional) [ ]
Address 03 (optional) [ ]
City [San Francisco]
State [CA - California ▽]
Zip Code [94122]
Phone ⓘ [Alternate ▽] [415-583-3840]
Email ⓘ [johnsmith@gmail.com]

[Cancel] [Save and Continue]

Auto Loan Application

▷ Getting started ✓

▷ Your information ✓

▽ Your car

30% Complete

818

Tell us about the car you've decided to buy.
If you change your mind you can always make updates after submitting your application.

Don't know your car? Use our Car Buying Service powered by TrueCar® to help you decide ● New    ○ Used

| | |
|---|---|
| Year | 2017 ▾ |
| Make | Choose one ▾ |
| Model | Choose one ▾ |
| Trim ⓘ | Choose one ▾ |

[ Next ]

▷ Your dealer

▷ Your loan

▷ Your finances

FIG. 8C

Auto Loan Application — 803

- Getting started
- Your information
- Your car
- ▽ Your dealer

45% Complete

2017 HONDA ACCORD SEDAN EX MANUAL
Estimated MSRP $27,710

820

Tell us the dealer that has your car.
Search for the dealer in our network where you know your car is located
ZIP code | City & state ZIP code: 19808
Dealer name (optional):

Tell us all or part of your dealer's name (e.g. "Honda" or "Toyota of Anytown").  [Search for dealers]

Choose your dealer ⊙

MARTIN DEALERSHIPS
5.25 mi
298 E. Cleveland Ave.
Newark, DE 19711
888-337-1970

Union Park Automotive Group Inc.
5.4 mi
1704 Pennsylvania Ave.
Wilmington, DE 19806

SCOTT HONDA OF WEST CHESTER
15.72 mi
706 Auto Park Blvd.
West Chester, PA 19382
877-392-3541

Roberts Auto Mall
18.97 mi
19 Park Lane
Downingtown, PA 19335

PLAZA HONDA OF SPRINGFIELD
21.62 mi

Please call 1-866-804-6781 if you have any questions, want to change your dealer, or cannot locate your dealer.

- Your loan
- Your finances

[Next]

Auto Loan Application

▷ Getting started ✓

▷ Your information ✓

▷ Your car ✓

▷ Your dealer ✓

▽ Your loan

60% Complete

2017
HONDA ACCORD SEDAN
EX MANUAL
Estimated MSRP $27,710 ⓘ

MARTIN DEALERSHIPS
298 E. Cleveland Ave
Newark, DE 19711
888-377-1970

How much do you need to borrow?
While you can adjust the amount of you loan and term when you get to the dealer, it's best to be as accurate as possible with your loan request, since changes can affect your approval and loan terms.

Do you have a down payment?

Down payment (optional) ⓘ  $ [       .00]

Do you have a trade-in? ⓘ
○ Yes    ○ No

What is the loan amount and term you need?

Use our Payment Calculator to help estimate your monthly payment.

Amount ⓘ  $ [       .00]

Term (months)  [Choose one ▽]

[Next]

▷ Your finances

— 822

824

Payment Calculator

Our calculator helps you estimate your monthly payment and total interest paid over the life of your loan. Just tell us your information and choose "Calculate."

Amount ⓘ [$0,000.00]   APR ⓘ [0.00%]

Term [Choose one ▽]

[Reset] [Calculate]

Repeat your search to compare up to 3 different loan options.

Auto Loan Application

- ▷ Getting started ✓
- ▷ Your information ✓
- ▷ Your car ✓
- ▷ Your dealer ✓
- ▷ Your loan ✓
- ▽ Your finances 70% Complete 2017
HONDA ACCORD SEDAN
EX MANUAL
Estimated MSRP $27,710 ⓘ

MARTIN DEALERSHIPS
298 E. Cleveland Ave
Newark, DE 19711
888-377-1970

Where do you live and work?

Your residence

Housing Status [Choose one ▾]

Monthly Payment [_____.00]

Time at residence  Years [__]  Month(s) [__]    — 826

Your employment and income

You're not required to reveal alimony, child support or separate maintenance income if you don't want it to be considered as a basis for repaying this obligation.    — 828

Employment status [Choose one ▾]

Do you have additional income?  ○ Yes  ○ No

[Next]

▷ Getting started ✓

▷ Your information ✓

▽ Your car

35% Complete

What car are you buying?
If you change your mind you can always work with your dealer to make updates.

● New          ○ Used

| | |
|---|---|
| Year | 2017 ▾ |
| Make | Honda ▾ |
| Model | Civic ▾ |
| Trim | Coupe Si ▾ |
| Mileage (optional) ⓘ | |
| Estimated MSRP ⓘ | $24,390 |

[ Next ]

▷ Your dealer

▷ Your loan

▷ Your finances

FIG. 8I

SYSTEMS AND METHODS FOR ONLINE AUTOMOBILE PURCHASING

CROSS-REFERENCE RELATED APPLICATIONS

The present application is a Continuation of U.S. patent application Ser. No. 16/974,369, filed Jun. 14, 2021, now U.S. Pat. No. 11,538,104, which is a Continuation of U.S. patent application Ser. No. 15/921,849, now U.S. Pat. No. 11,037,237, filed Mar. 15, 2018, which claims priority to U.S. Provisional Patent Application No. 62/472,127, filed Mar. 16, 2017, the contents of each of which are incorporated herein by reference in their entireties.

FIELD OF THE VARIOUS EMBODIMENTS

Exemplary embodiments relate to providing a full service online automobile buying and funding experience and process.

BACKGROUND

Many car buyers dislike the traditional car buying experience. This dislike has led to car buyers using online (e.g., Internet based) automobile buying services or loan providers. However, current online automobile buying services suffer from numerous deficiencies. For example, current online, or Internet based, automobile buying services: do not offer integrated loan applications and approval (including requiring separate credit applications at the dealer), have limited dealer participation, have vehicle restrictions (e.g., the service is restricted to only new or used vehicles), require a membership (e.g., are restricted to members only or require joining prior to using the service), fail to reflect actual new car inventory at participating dealers, lack the ability to account for trade-ins or down payments, some offer only online car choices (e.g., lack a physical dealer tie-in), are merely financing services (i.e., lack a automobile configuration or selection component). Many services have a combination of the preceding deficiencies and/or suffer from other deficiencies. Overall, these existing services fail to offer a complete car buying experience for a user.

These and other deficiencies exist. Exemplary embodiments solve these deficiencies.

SUMMARY OF THE VARIOUS EMBODIMENTS

Exemplary embodiments include a system having: a server, communicatively coupled to a network, and including at least one processor and tangibly disposed memory, the server being configured to: present a first interface to a user over the network, the first interface including a selection screen; receive, over the network, a first input from the user through the first interface, wherein the first input including at least selection of an automobile buying option; present a second interface to the user, over the network, based on the first input, the second interface including a set of options for configuration of an automobile; receive, over the network, a second input form the user through the second interface, wherein the second input includes selection of one or more options configuring the automobile; present a third interface to the user, over the network, based on the second input, the third interface including a listing of one or more dealerships that have the configured automobile; receive, over the network, a third input from the user through the third interface, wherein the third interface includes selection of a dealership; present a fourth interface to the user, over the network based on the third input, the fourth interface including an application for financing to purchase the configured automobile; receive, over the network, a fourth input from the user through the fourth interface, wherein the fourth input includes input of requested information relating to the financing; and provide the user a confirmation of approval of the financing for the configured automobile.

These and other embodiments and advantages will become apparent from the following detailed description, taken in conjunction with the accompanying drawings, illustrating by way of example the principles of the various exemplary embodiments.

BRIEF DESCRIPTION OF THE DRAWINGS

FIG. 1A depicts a method for on-line car buying in accordance with an exemplary embodiment.

FIG. 7 depicts a loan application page according to an exemplary embodiment.

FIGS. 8A through 8I depict loan application pages according to an exemplary embodiment.

DETAILED DESCRIPTION OF THE PREFERRED EMBODIMENTS

Figure 1B:
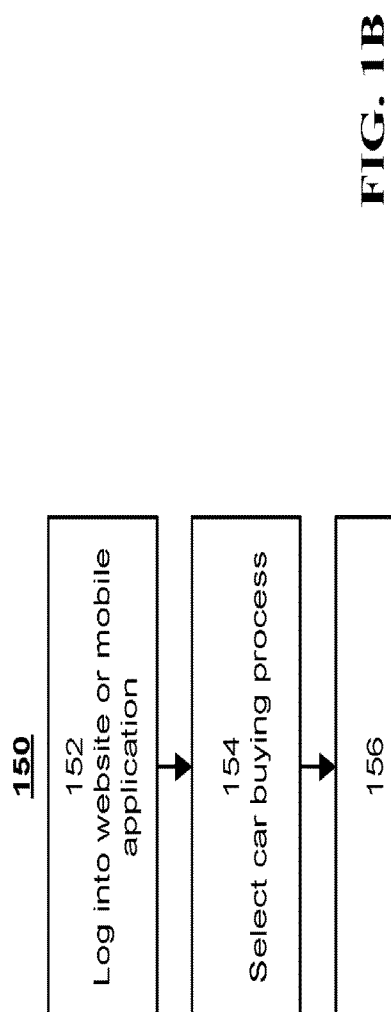
FIG. 1B depicts another method for on-line car buying in accordance with an exemplary embodiment.

It will be readily understood by those persons skilled in the art that the embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. While the various exemplary embodiments are described in the context of purchasing automobiles, the methods and systems described herein may be applied to other related services involving interaction with similar devices.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Further, the various embodiments and their advantages may be understood by referring to the accompanying figures. It should be appreciated that the various examples in the attached figures are exemplary and non-limiting. For example, the figures may refer to Chase as the financial institution. However, it should be appreciated that reference to a particular financial institution in the figures and examples herein is meant to be exemplary and non-limiting.

The term "automobile," "car," and "vehicle," as used herein, is meant to be interchangeable and meant to refer to passenger vehicles purchased by consumers including, but not limited to, cars, trucks, SUVs, hybrids, electric vehicles, etc.

The term "financial institution," as used herein, may include institutions that provide financial services to their members or customers. Financial institutions may include, but are not limited to banks, credit unions, trust companies, mortgage loan companies, insurance companies, investment banks, underwriters, and brokerage firms. The use of the term "financial institution" herein is meant to be exemplary and non-limiting.

The term "customer," as used herein, may refer to an individual who holds at least one account with a financial institution. For example, the customer may have one or more credit accounts and/or a checking account with a financial institution. In various embodiments, "customer" may be referred to as a "user."

According to exemplary embodiments, the system described herein providing the online automobile buying and financing experience may be referred to as "Direct to Dealer" (D2D), "Chase Auto Direct" (CAD), and/or Auto Direct. This system improves upon existing automobile buying processes and systems by providing the user a "one-stop" complete experience. The user (either a customer of the financial institution or a non-customer of the financial institution) may be able to configure a desired automobile for purchase, select a dealer, receive a guaranteed price savings for the desired automobile (or, in various embodiments, a guaranteed price), apply for and receive a loan/financing for the desired automobile, proceed to the dealer for completion of the process (signing the paperwork and taking delivery of the automobile). The process may include both new and used cars. This system provides improvements resulting, in part, from the integration of different systems, such as an online automobile buying platform, loan/financing system, and automobile dealer systems. The online automobile buying and financing experience according to exemplary embodiments allows for these different systems to communicate and share information, resulting in an improved automobile buying process for the user. For example, the entire process, short of going to the dealer to pick-up the automobile, can be completed using exemplary embodiments.

FIG. 1A depicts a method according to exemplary embodiments. The exemplary method 100 may include the following steps: 1) visit or login to website; 2) automobile configuration; 3) dealer selection and pricing; 4) print certificate of price; 5) loan/financing application and approval; and 6) complete transaction with dealer. As a (optional) threshold step to find potential users (e.g., buyers), the financial institution may market the process to certain customers, as well as non-customers. In various embodiments, the user will not be required to select a dealer as noted in step 3 above. The user will be able to proceed to any dealer (e.g., such as dealers within the financial institution's network of dealers) and will receive a unique dealer experience. The dealer selected will expedite the user into a seamless process that is less timing consuming for the user (e.g., the user may have to spend less time at the dealer to consummate the transaction of the vehicle).

At (optional) block 102, the financial institution may identify potential users of the system through targeted marketing as well as general awareness advertising and pre-approval for loan/financing status, for example.

At block 104, the system may be accessed and the process may begin by visiting or logging into a website. According to exemplary embodiments, the website may be a website associated with a financial institution (e.g., the website that a customer of the financial institution would access to manage their accounts and conduct transactions). In some embodiments, a separate website may be used to access the system. This may enable non-customer to access to the system. Non-customers may be provided with the option of proceeding as a guest or creating an account to use the car buying process. In various embodiments, both the website associated with the financial institution and the separate website may be used. Alternatively and/or in addition to website access, a mobile application may be used to access the system. In some embodiments, the mobile application may an application associated with the financial institution (e.g., the mobile application that a customer of the financial institution would access to manage their accounts and conduct transactions).

At block 106, the car buying process may be selected. For example, at the website (or mobile application), the user may be provided with an option to select and start the car buying process.

At block 108, options to configure a desired automobile may be presented to the user (i.e., customer or non-customer). According to exemplary embodiments, the configuration may be done through a third party provider. For example, a car configuration online service, such as TRUECar or the like, may be used. The third party provider may partner with the financial institution and provide a branded site for use with the process described herein. The branded site may be a part of the system accessed in the preceding steps. For example, the car configuration options may be presented directly to the user within the system (i.e., the user is not taken to an external website and the process appears seamless to the user). In various embodiments, the user may be linked to an external website associated with the third party provider. Once the user has entered a desired configuration, according to exemplary embodiments, the user may be able to browse and select from new and used cars meeting the user's desired configuration.

At block 110, once the user has configured a desired automobile, a dealer may be selected. This step may be optional. The user may be provided with a listing of dealers who have the desired automobile; that is, the dealer inventory may be available in the system. The dealers available may be based on dealers who have agreed to participate in the car buying program with the financial institution. The dealers may be partners with the financial institution. The user may provide a location of desired dealers (e.g., the user may provide a radius from the user's location that they are willing to travel to a dealer) to filter the dealer listing. In various embodiments, the dealer listing may be tailored based on the customer information. For example, the dealer listing for a customer of the financial institution may be filtered and appropriate local dealers presented to the user who is a customer. For a non-customer, the system may ask the user to input their zip code so that local dealers can be presented.

At block 112, once a dealer is selected, a guaranteed price savings for the automobile as configured may be presented. It should be appreciated that the price of the car may vary based on the dealer location. The user may print a certificate reflecting the price or save it for access later (e.g., the certificate may be accessible from a mobile device). The user may end the process here and not proceed to the loan/financing portion described below. The user may then proceed to the dealer to receive the automobile as depicted in the method 100.

At block 114, loan/financing may be applied for. The user may specify the loan amount or level of financing desired. For example, the user may input the amount of a down payment they can make. In various embodiments, the user may be able to specify that the user has a trade-in. The program may ask for details on the trade-in and provide the user with a value for the trade-in at the dealer.

The loan/financing portion of the process may evaluate the user's credit score as well as other information and provide a loan/financing to the user. The user may be required to fill out appropriate information for the loan/financing. In the case of a customer of the financial institution, the approval process may be streamlined because the financial institution already has the necessary information on the user for evaluation on the loan/financing. The application form may be prefilled with the customer's information.

Alternatively, the customer may not even be required to fill out any form. The system may automatically evaluate the customer's record and provide the necessary loan/financing for the desired automobile. The customer may be able to adjust the amount desired. The adjustment may be limited by the approved or pre-approved amount subject to various rates and terms.

The approval may occur during the online session in real-time. In various embodiments, additional time may be required for an approval or decision on the loan/financing. For example, a non-customer may require more time for processing of the application.

In various embodiments, the user may be presented with different loan and financing options. The user may select an option.

If the user accepts the offered loan/financing, and the user is a non-customer, the user enrolls online with a user id and password at the financial institution. In various embodiments, the user may be under no obligation to accept the loan/financing offer.

At block 116, following the approval process, information on the user and the approved financing may be forwarded to the dealer. The financial institution may send the loan/financing documentation directly to the selected dealer.

At block 118, the user then may proceed to the dealer and sign the paperwork and receive their car. In various embodiments, the user may be contacted by the dealer or may contact the dealer, to set up an appointment to receive the automobile and complete the transaction.

In various embodiments, the user may change options or other features of the automobile at the dealer. The user may add aftermarket features to the automobile at the dealer. If these changes impact the already approved loan/financing amounts, then the dealer may input these changes to the financial institution and have the loan/financing altered appropriately.

In various embodiments, as depicted in the method 100, the user may bypass the car configuration option and apply directly for a loan to be fulfilled at a dealer (which may be selected by the user). In other embodiments, the user may apply for a loan and that loan may be used at any dealer that participates in the program. The loan value may then be applied towards a car of the user's choice at the dealer directly. The user can then select to use the automobile buying service according to exemplary embodiments to view real-time payments.

In various embodiments, the loan approval or pre-approval may be the first step in the method 100 (e.g., after login at block 104, the method 100 may start with block 114 then proceed to block 106 or, alternatively, after login and selection at block 106, the method may start with block 114) and then the car selection at block 108, etc. is conducted. The loan rates and payments may be displayed during selection of the automobile based on the approved loan/financing. For example, a user could submit a loan application and get approved (e.g., for loan amount, rate(s), and term(s)) or get a pre-approved offer (e.g., using internal and external data to provide a customer with a loan amount, rate(s) and term(s)), and then the user may choose to use the automobile buying service of exemplary embodiments to find a car and dealer. During the method, the approved rate and term may be leveraged to show the user real time monthly payment amounts for the automobile(s) he/she is interested in.

Other orders of the method steps are possible.

In various embodiments, the user may be approved or pre-approved up to a particular amount, which, in some embodiments, may influence the user's car selection or determine the choices for selection that are displayed to the user.

The financial institution may have systematic logic to pre-approve selected users for financing/loan. It will be readily understood that those users will be uniquely identified using credit information (e.g., internal and/or external information) and various embodiments to determine the population of the pre-approval decision. A pre-qualified user may be able to take advantage of the offer. The offer may be executed through a website (such as that described herein) or, in some embodiments, through a telephone process. The pre-qualified offer may include, but is not limited to, a loan amount, terms, rates, and/or a pre-defined interest rate.

The financial institution may have relationships with various automobile manufacturers, which maybe referred to as original equipment manufacturers or OEMs. Through these relationships, the financial institution may offer incentives and exclusive financing options to customers. Further, after the automobile purchase through the car buying process, the customer may receive other incentives and perks, such as, but not limited to, discounts on new models of automobiles, extended maintenance contracts and warranty extensions. Non-customers may receive these incentives and perks or may receive differing incentives and perks. The customer may be able to select a particular OEM (e.g., car manufacturer) website to log into during the process. This option may be provided at the end of the process and based on the users selected automobile. In various embodiments, the user may be directed to the OEM site at the beginning of the configuration process upon the user selecting a particular make of car. In other embodiments, the user may be presented with a listing of participating car manufacturers to select from to begin the car configuration process.

FIG. 1B depicts another method according to exemplary embodiments. The exemplary method 150 may include the following steps: 1) visit or login to website; 2) eligibility check for loan pre-approval; 3) car or dealer selection; 4) loan/financing application and approval; and 6) complete transaction with dealer. The (optional) threshold step to find potential users (e.g., buyers), the financial institution may market the process to certain customers, as well as non-customers, may be applicable to the method 150 as described above in the method 100.

At block 152, the system may be accessed and the process may begin by visiting or logging into a website. According to exemplary embodiments, the website may be a website associated with a financial institution (e.g., the website that a customer of the financial institution would access to manage their accounts and conduct transactions). In some embodiments, a separate website may be used to access the system. This may enable non-customer to access to the system. Non-customers may be provided with the option of proceeding as a guest or creating an account to use the car buying process. In various embodiments, both the website associated with the financial institution and the separate website may be used. Alternatively and/or in addition to website access, a mobile application may be used to access the system. In some embodiments, the mobile application may the an application associated with the financial institution (e.g., the mobile application that a customer of the financial institution would access to manage their accounts and conduct transactions).

At block 154, the car buying process may be selected. For example, at the website (or mobile application), the user may be provided with an option to select and start the car buying process.

At block 156, an eligibility check may be performed. The eligible check may be for customers of the financial institution. The check may determine if the user is pre-approved for a loan amount/financing. In various embodiments, a matrix of loan amounts and interest rates may be presented for the user to review and select. In some embodiments, a non-customer may be asked to enter identifying, personal information and a eligibility check may be performed and that user may be presented with pre-approval of one or more financing options (e.g., loan amounts).

At block 158, a selection of car or dealership is performed. The user may select whether the car or dealership is important.

At block 160, a dealer is selected. A listing of dealers may be presented to the user. The listing may be based on location of the user and/or participating dealers. The dealers available may be based on dealers who have agreed to participate in the car buying program with the financial institution. The dealers may be partners with the financial institution. The user may provide a location of desired dealers (e.g., the user may provide a radius from the user's location that they are willing to travel to a dealer) to filter the dealer listing. In various embodiments, the dealer listing may be tailored based on the customer information. For example, the dealer listing for a customer of the financial institution may be filtered and appropriate local dealers presented to the user who is a customer. For a non-customer, the system may ask the user to input their zip code so that local dealers can be presented.

At block 162, if dealer is selected, an inventory of available automobiles and pricing, from the selected dealer, is displayed. The inventory may be a subset of the available inventory. For example, only certain vehicles may be displayed based on pricing eligibility or other criteria for the car buying system. In various embodiments, the entire inventory of the dealer may be displayed.

At block 164, a car is selected. The automobile may be selected from the inventory. A guaranteed price savings for the automobile as configured may be presented.

At block 166, loan/financing may be applied for. The user may specify the loan amount or level of financing desired. For example, the user may input the amount of a down payment they can make. If the user was pre-approved, the information on the pre-approved loan/financing may be provided. In various embodiments, if the user is pre-approved, no further action may be required from the user other than confirmation of the terms and conditions of the pre-approved loan/financing.

In various embodiments, the user may be able to specify that the user has a trade-in. The program may ask for details on the trade-in and provide the user with a value for the trade-in at the dealer.

The loan/financing portion of the process may evaluate the user's credit score as well as other information and provide a loan/financing to the user. The user may be required to fill out appropriate information for the loan/financing. In the case of a customer of the financial institution, the approval process may be streamlined because the financial institution already has the necessary information on the user for evaluation on the loan/financing. The application form may be prefilled with the customer's information. Alternatively, the customer may not even be required to fill out any form. The system may automatically evaluate the customer's record and provide the necessary loan/financing for the desired automobile. The customer may be able to adjust the amount desired.

The approval may occur during the online session in real-time. In various embodiments, additional time may be required for an approval or decision on the loan/financing. For example, a non-customer may require more time for processing of the application.

In various embodiments, the user may be presented with different loan and financing options. The user may select an option.

If the user accepts the offered loan/financing, and the user is a non-customer, the user becomes a customer of the financial institution. In various embodiments, the user may be under no obligation to accept the loan/financing offer.

At block 168, the user then may proceed to the dealer and sign the paperwork and receive their car. Before proceeding to the dealer, the user may print a certificate reflecting the price or make the certificate accessible from a mobile device. Following the approval process, the dealer may receive information on the user and the approved financing. The financial institution may send the loan/financing documentation directly to the selected dealer. The user then may proceed to the dealer and sign the paperwork and receive their car. In various embodiments, the user may be contacted by the dealer or may contact the dealer, to set up an appointment to receive the automobile and complete the transaction. As described above, the user may receive a unique, accelerated dealer experience to expedite the users' transaction processing time. For example, the full processing time for the interaction between the dealer and the user may be within 60 minutes. The financial institution may work with the dealer to implement the proper procedures and training that may include reducing documentation, a concierge service, and unique user treatment.

In various embodiments, the user may change options or other features of the automobile at the dealer. The user may add aftermarket features to the automobile at the dealer. If these changes impact the already approved loan/financing amounts, then the dealer may input these changes to the financial institution and have the loan/financing altered appropriately.

At block 170, if car is selected at block 108, a listing of available automobiles across various dealers in the geographic area of the user is provided. A guaranteed price savings for each automobile as configured may be presented.

At block 172, a car from the listing may be selected.

As described above with respect to the method 100 of FIG. 1A, the order of the method 150 may be altered such that the loan approval or pre-approval may be performed first (e.g., after initiating the method at one of blocks 152 or 154 or 156, the method 150 may start with block 166 then proceed to block 158). The loan rates and payments may be displayed during selection of the automobile. For example, a user could submit a loan application and get approved (e.g., for loan amount, rate(s), and term(s)) or get a pre-approved offer (e.g., using internal and external data to provide a customer with a loan amount, rate(s) and term(s)), and then the user may choose to use the automobile buying service of exemplary embodiments to find a car and dealer. During the method, the approved rate and term may be leveraged to show the user real time monthly payment amounts for the automobile(s) he/she is interested in.

Other orders of the method steps are possible.

FIGS. 2 through 8 (A through I) provide exemplary pages (e.g., webpages or mobile application screens) for the car buying service according to exemplary embodiments. It should be appreciate that the information and arrangements depicted in these figures is meant to be exemplary and non-limiting. Further, any particular examples or other information depicted in these figures is for illustrative purposes only and meant to be non-limiting.

Figure 2:
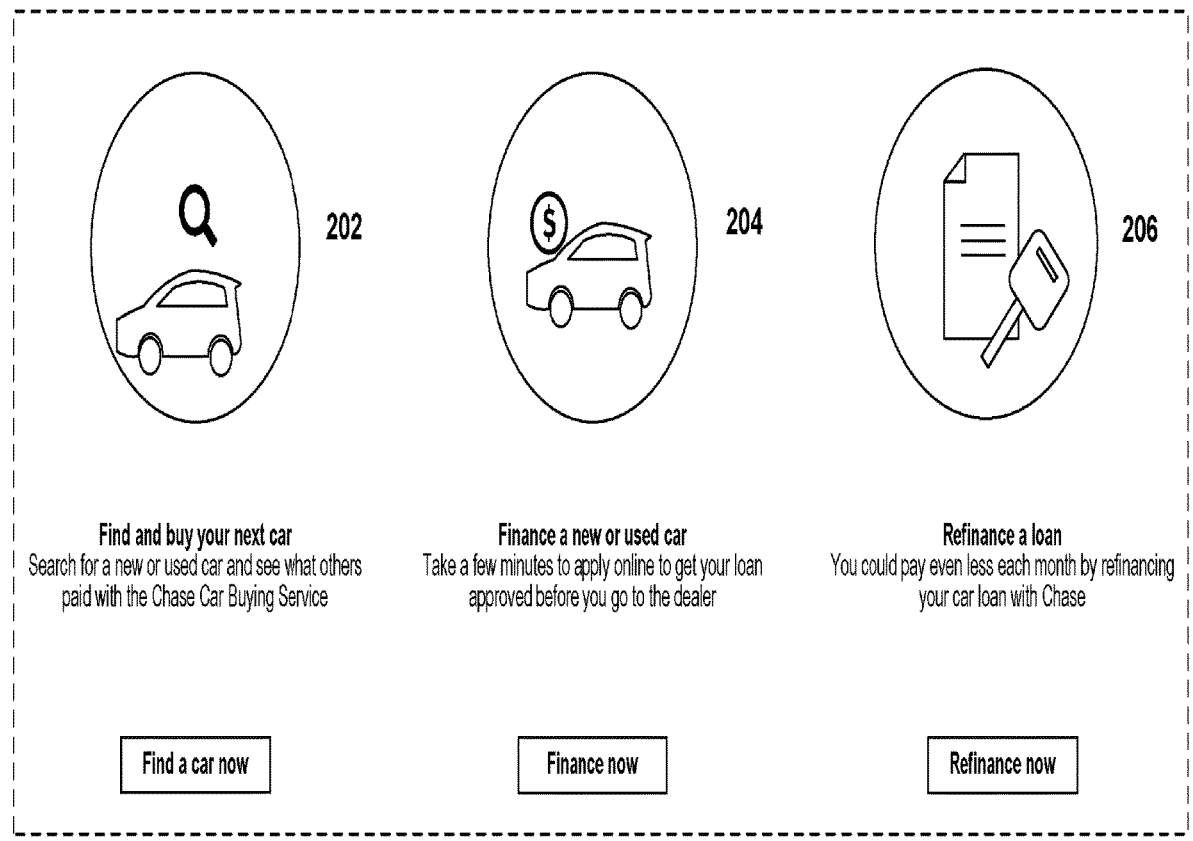
FIG. 2 depicts a portion of starting page for the car buying service according to an exemplary embodiment.

FIG. 2 depicts a portion of starting page 200 for the online buying service according to an exemplary embodiment. At this page, the user may be presented with a series of options regarding the buying service. For example, the user may be presented with three options (202, 204, and 206) as depicted in FIG. 2 ("Find and buy your next car," "Finance a new or used car," and "Refinance a loan"). The first option may allow the user to search for a new or used car. The second option may allow a user to search for a new or used car and finance the car. The third option may allow a user to refinance an existing car loan. Each option may have an icon, a description, and a selection button as depicted in FIG. 2. Upon selection of a particular option, the user may be taken to another page to further complete the selected option.

Figure 3:
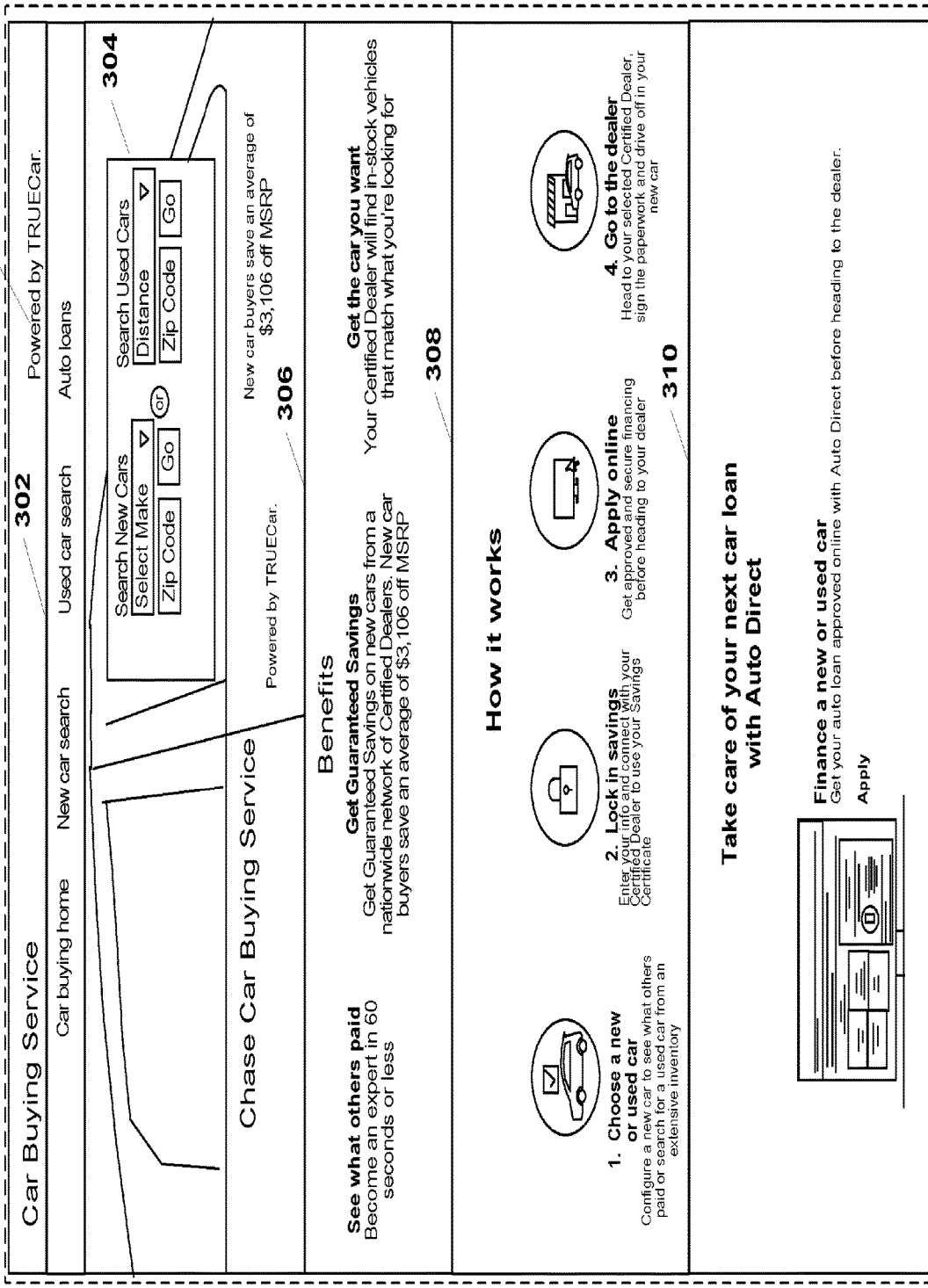
FIG. 3 depicts a landing page for the car buying service according to an exemplary embodiment.

FIG. 3 depicts a landing page 300 for the car buying service according to an exemplary embodiment. The landing page 300 may be the starting page for a user entering the car buying service. At this page the user may be presented with information on the car buying service. In the embodiment shown, a branded page using TRUECar for the car search service is depicted (as depicted at portion 301). This page is meant to be exemplary as other third party car buying services may be used. The landing page 300 may have a menu selection bar 302. This upper portion (i.e., the branding and menu selection bar) may be repeated on subsequent pages of the car buying service.

A search entry area 304 may be provided allowing a user to search for new and/or used cars by entering certain search criteria. It should be appreciated that the search criteria depicted at 304 is exemplary and other search criteria may be used. A section 306 may include information on the benefits of the car buying service. A section 308 may provide an overview of the process for the car buying service. A section 310 may provide information on the loan feature of the car buying service.

Figure 4:
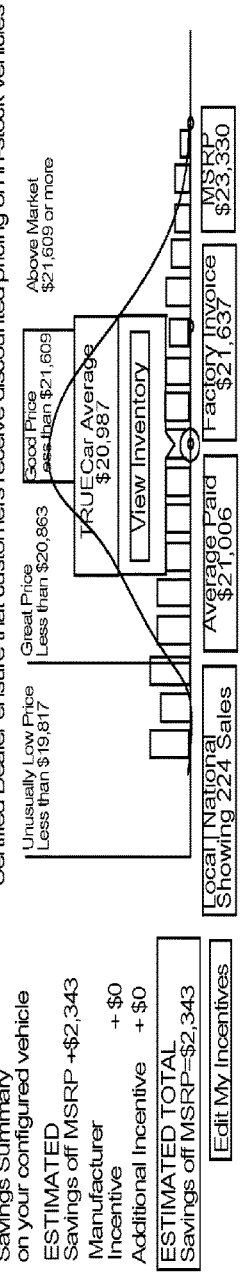
FIG. 4 depicts a car configuration page according to an exemplary embodiment.

FIG. 4 depicts a car configuration page 400 according to an exemplary embodiment. On this page, the user may configure the desired automobile. At configuration section 402A and 402B, the user may configure a desired automobile (for illustrative purposes a 2016 Honda Accord is depicted). The user may be able to select different available options for the vehicle and be presented with estimated loan payments, estimated savings, and an overall cost estimate. The section 402 may be split (A and B) between the upper and lower portions of the page as depicted. A selection to view more accurate pricing on local dealer inventory may be provided at 404. A pricing information section 406 may be provided explaining the pricing model. A pricing section 408 may be provided with detailed pricing analysis information based on a user's location (i.e., based on zip code).

Figures 5A, 5B:
FIGS. 5A and 5B depicts a basic information page and terms & conditions page according to an exemplary embodiment.

FIGS. 5A and 5B depicts a basic information page 500 and terms & conditions page 501 according to an exemplary embodiment. The page 500 may be an entry page requesting the user to verify their information prior to seeing the dealing pricing. All or a portion of the requested information may be pre-filled in based on the user information entered previously or known from the user being a financial institution customer. The page 501 may be a terms & conditions page presented after the information is entered requesting the user agree to certain terms & conditions prior to viewing the dealer pricing.

Figure 6:
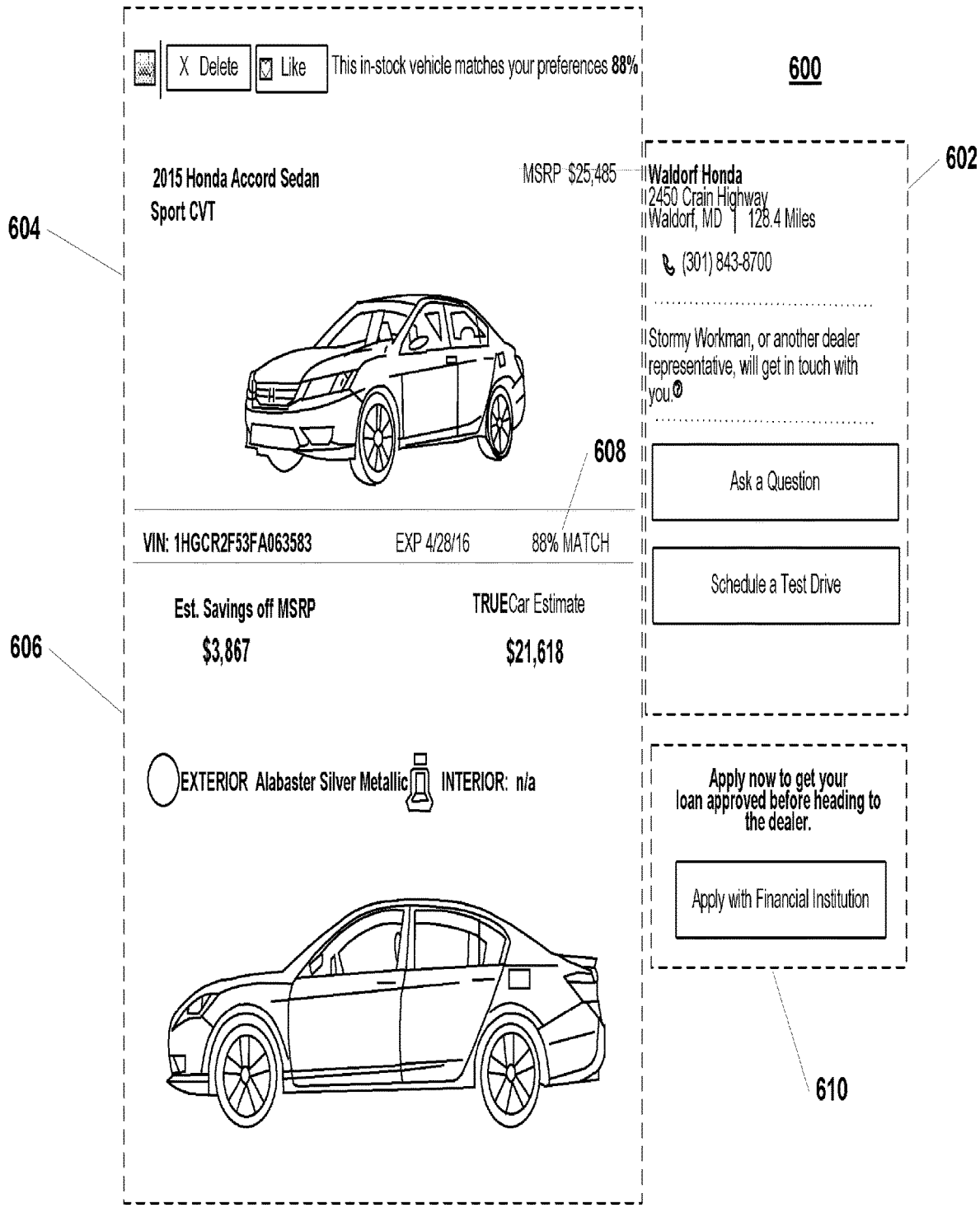
FIG. 6 depicts a certificate page according to an exemplary embodiment.

FIG. 6 depicts a certificate page 600 according to an exemplary embodiment. Following the pages 500 and 501, the certificate page 600 may be presented. The page 600 may provide information 602 on a participating dealer that has the desired automobile in inventory. The user may be provided with contact information for the dealer and the option to schedule a test drive. At 604, the desired automobile may be displayed (i.e., what the user configured and desires). At 606, a matching specific automobile in inventory at the dealer may be displayed. Information on the closeness of the match between the actual automobile at the dealer and the desired automobile may be displayed at 608. At 610, an option to apply for financing with the financial institution may be presented.

FIG. 7 depicts a loan application page 700 according to an exemplary embodiment. At 702, the user may be presented with an overview of the process for buying a car. At 704, a summary of the selected automobile may be presented, along with the selected dealer information. At 706, a progress indicator may be presented indicating the percentage completion for the process. For example, the car buying process may be 50% complete at this point.

FIGS. 8A through 8I depict loan application pages according to an exemplary embodiment.

Figure 8A:
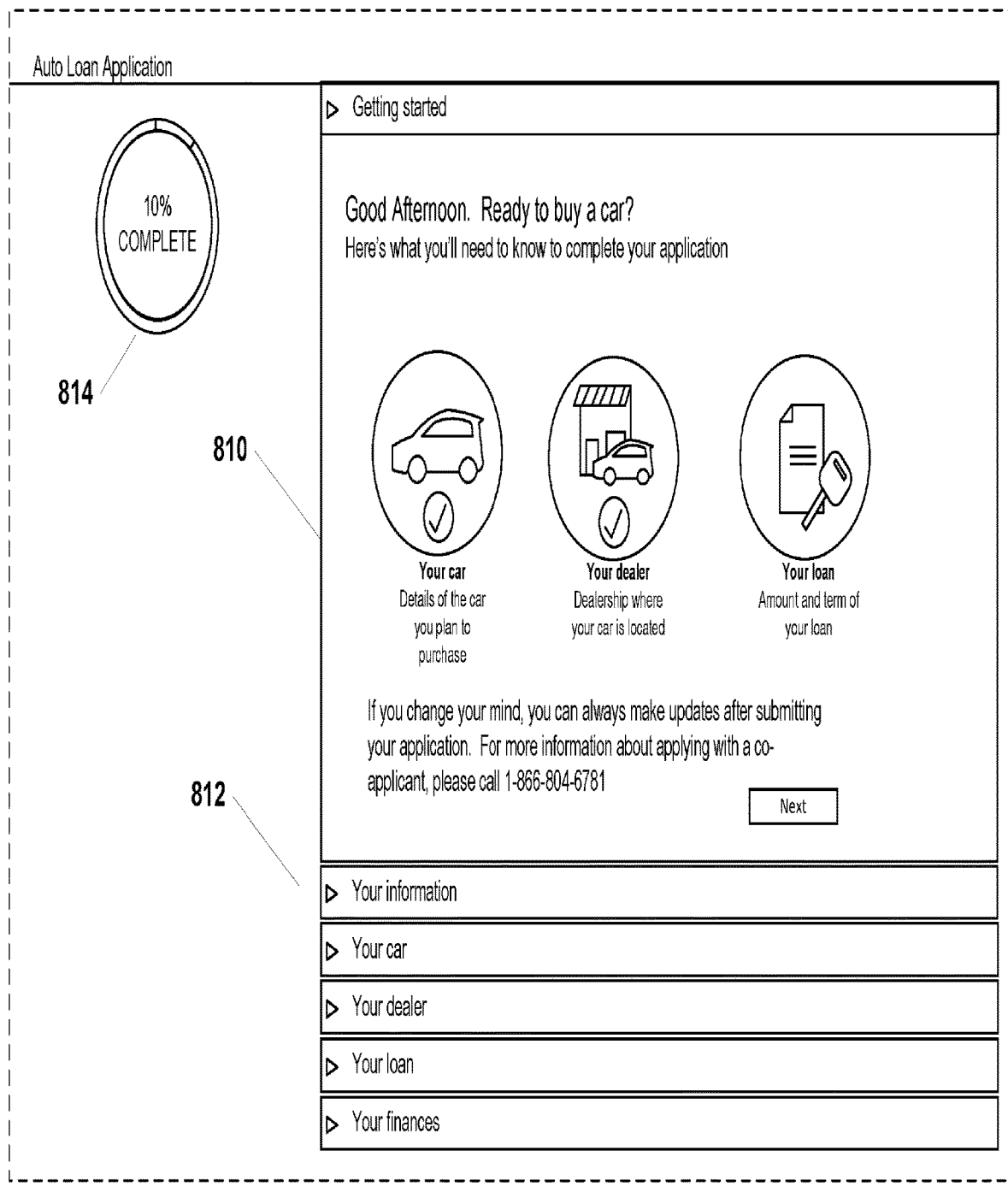

FIG. 8A depicts a start page 800 for a loan application process for an automobile. This page may follow page 700. The page may provide information to the customer 810 on what is needed to complete the loan application. The various sections that require review and completion may each be available (as depicted at 812) so that the user can see the steps requires. Each section can be opened by clicking on it. Additionally, this page, as well as subsequent pages depicted as part of FIG. 8, may include a progress indicator 814 that provides a user with a visual indication of progress.

FIG. 8B depicts a second page 801 in the loan application process in which the user may verify and edit (if necessary) (816) their personal information. Upon selecting an edit option, a pop-up or side window may open allowing the user to edit the information. Additionally, if the user is a customer of the financial institution, the personal information may be prepopulated by the system based on information from the financial institution. For non-customers, the user may be asked to input required information. In some embodiments, information for a non-customer may be prepopulated based on information gathered from other steps of the process.

FIG. 8C depicts a page 802 where the user may identify the automobile he/she desires to purchase at 818. The information regarding the automobile may be prepopulated with information from other steps of the process, such as the car configuration information. The user may be able to change the automobile information.

FIG. 8D depicts a page 803 where the user may identify the dealer information 820. The information regarding the dealer may be prepopulated with information from other steps of the process, such as selection of a particular car in the car configuration process. The user may be able to change the dealer information. The user may be presented with a listing of possible dealers having the desired automobile in inventory.

FIG. 8E depicts a loan configuration page 804. The user may be able to identify parameters of the desired loan 822, such a down payment amount, a loan amount, and a term. A payment calculator 824 may be provided to assist the user.

FIG. 8F depicts a page 805 for the user to enter residence (826) and employment information (828). If the user is a customer of the financial institution, the information may be prepopulated by the system based on information from the financial institution. For non-customers, the user may be asked to input required information. In some embodiments, information for a non-customer may be prepopulated based on information gathered from other steps of the process.

Figure 8G:
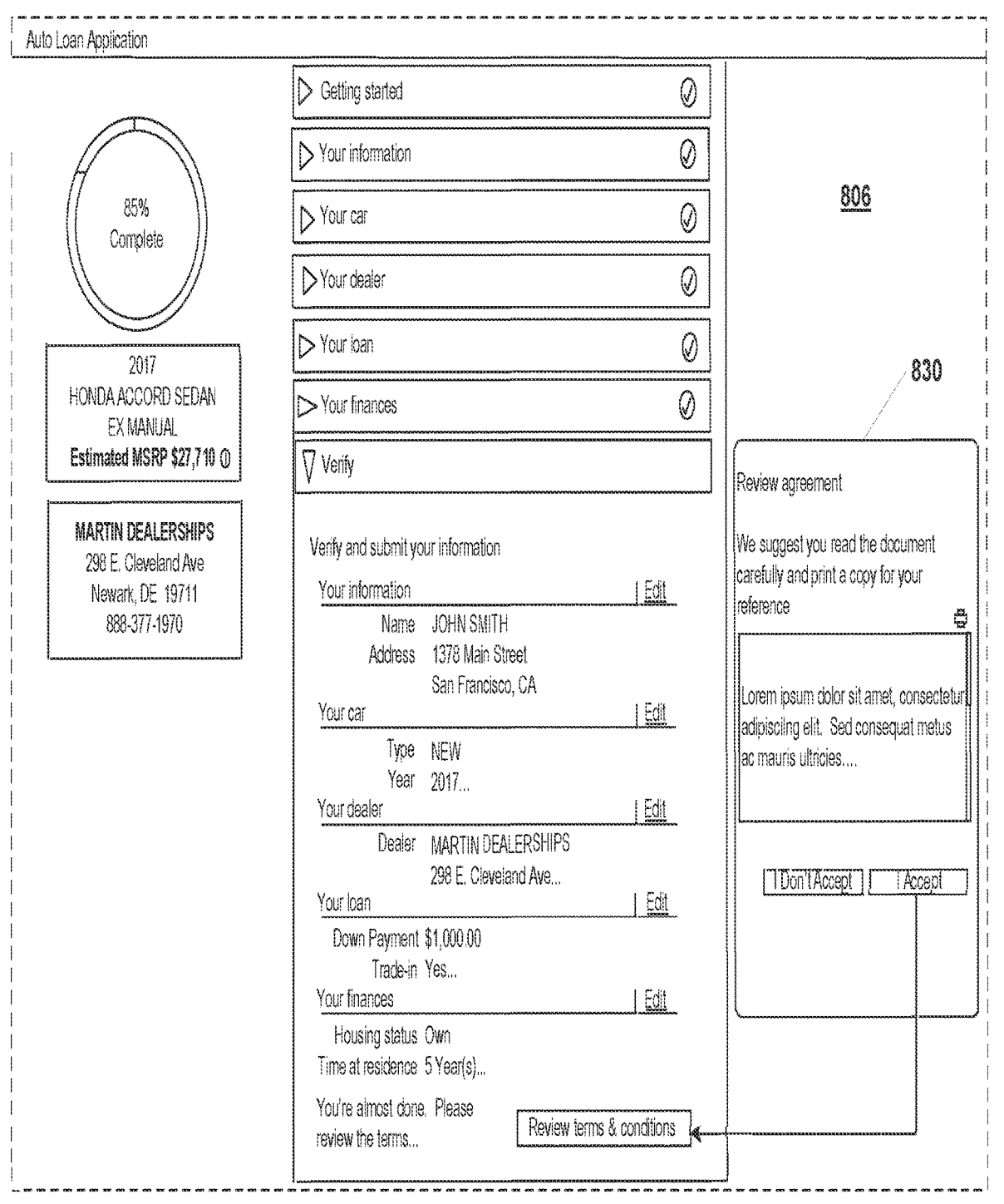

FIG. 8G a verification and acknowledgment page 806. The user may review the information entered in the previous pages and review the agreement 830.

Figure 8H:
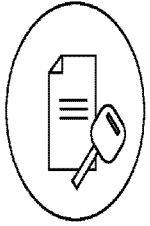

FIG. 8H depicts an approval page 807. Once the user have verified the information and acknowledged the terms on the previous page, the user may be presented with an approval page detailing the loan (832) and other pertinent information, such as what the user is required to next (834). If some situations, the user may not be approved and may be presented with information regarding the lack of approval and next steps to take.

FIG. 8I depicts a loan application page 808 for an OEM partner according to an exemplary embodiment. The financial institution may have relationships with various automobile manufactures. Through these relationships, the financial institution may offer incentives and exclusive financing options to customers. Further, after the automobile purchase through the car buying process, the customer may receive other incentives and perks, such as, but not limited to, discounts on new models of automobiles, extended maintenance contracts and warranty extensions. Non-customers may receive these incentives and perks or may receive differing incentives and perks. The customer may be able to select a particular OEM (e.g., a particular car manufacturer) website to log into during the process. This option may be provided at the end of the process and based on the users selected automobile. In various embodiments, the user may be directed to the OEM site at the beginning of the configuration process upon the user selecting a particular make of car. In other embodiments, the user may be presented with a listing of participating car manufacturers to select from to begin the car configuration process.

Figure 9:
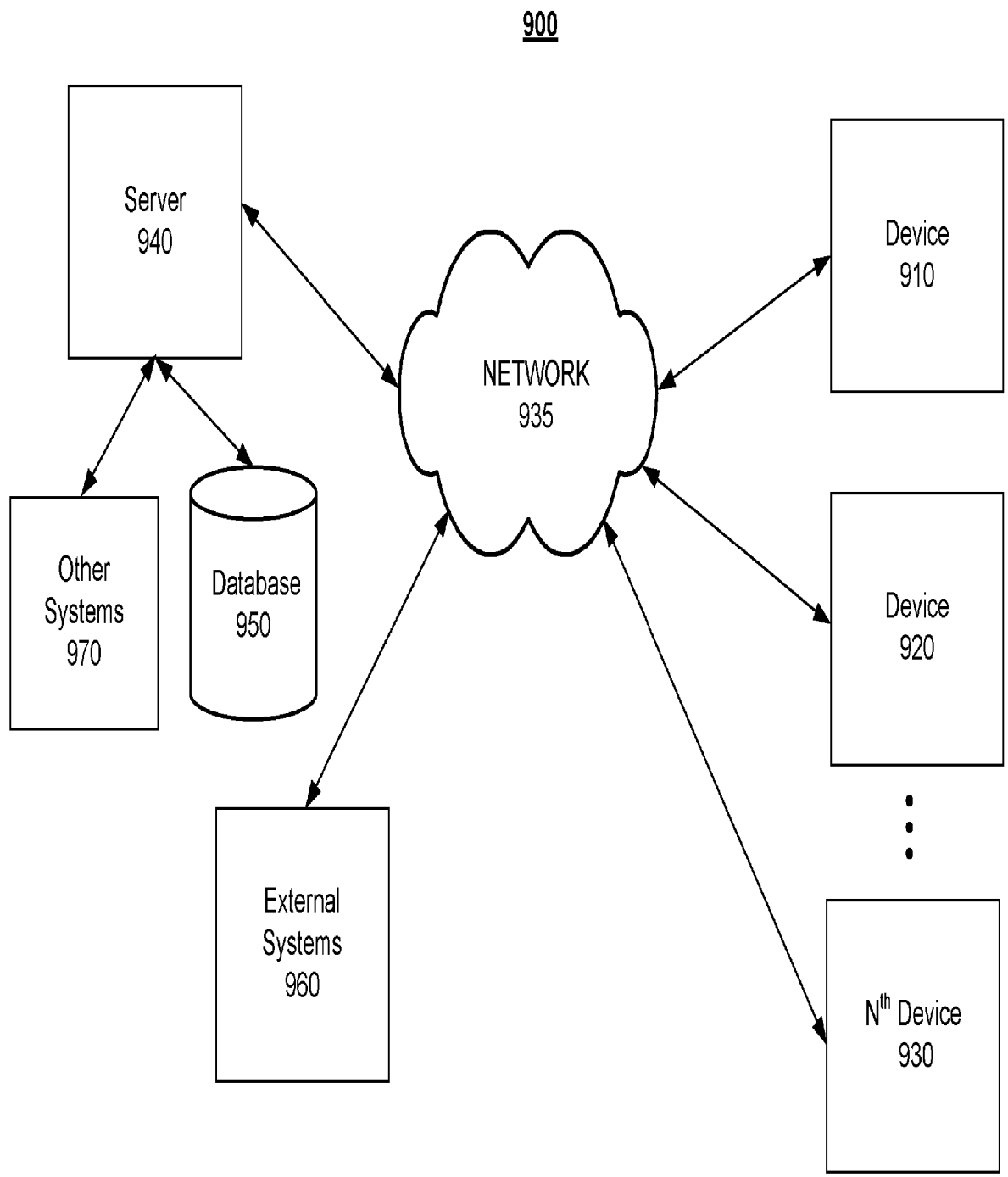
FIG. 9 depicts a system according to an exemplary embodiment.

FIG. 9 depicts a system 900 according to an exemplary embodiment. System 900 may provide various functionality and features associated with the automobile buying and financing program described above. More specifically, system 900 may include a device 910, a second device 920, and an Nth device 930, a network 935, a server 940, a database 950, one or more external (e.g., third party) systems 960, and other financial institution systems 970.

According to exemplary embodiments, the system 900 may be configured to carry out the methods as described herein. The system 900 may have device 910 associated therewith. A second device 920 and an Nth device 9130 may be further associated with the system 100. The devices 910, 920, and 930 may each be a processing machine. Each device 910, 920, and 930 may include software and/or modules to implement the methods described herein according to exemplary embodiments. Each device 910, 920, and 930 may provide processing, display, storage, communications, and execution of commands in response to inputs from a user thereof and respond to requests from the software and/or modules. It should be appreciated that even though the devices 910, 920, and 930 may be referred to in the subsequent description, the system 900 may use any combination of these devices ranging from one device 910 to multiple devices 910, 920, and 930.

The devices 910, 920, and 930 may each serve as a client side. The devices 910, 920, and 930 may be configured to perform other functions and processing beyond the methods described herein. For example, the devices 910, 920, and 930 may be multi-functional in operation. The devices 910, 920, and 930 may each support the operation and running of one or more applications or programs. For example, devices 910, 920, and 930 may include one or more computer processors and be capable of being programmed to execute certain tasks. According to some embodiments, the devices 910, 920, and 930 may be portable electronic devices or mobile electronic devices. The user may interact with the portable electronic device through various input devices (not shown). The portable electronic devices may have communication capabilities over both cellular and wireless type networks to transmit/receive data and/or voice communications.

For example, the portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n.

In some embodiments, the devices 910, 920, and 930 may be other types of computing platforms, such as, for example, a desktop computer or a laptop computer. The devices 910, 920, and 930 may be a combination of computing devices, such as a combination of portable electronic devices and other computing platforms.

The devices 910, 920, and 930 may establish communications with other parts the system 900, such as server 940, over a network 935. Upon successful initiation of communications between the and the network 935 and another part of the system 100, such as, for example, server 940, data may be exchanged between device 910, 920, and 930 and the server 940 over the network 935. Data may be transmitted to/from devices 910, 920, and 930 and to/from the server 940. The devices 910, 920, and 930 may be geographically dispersed from each other and the server 940.

The devices 110, 120, and 130 may each be remotely accessible. Remote access may be used to configure, troubleshoot, and wipe the contents of the device, for example.

Network 935 may be a computer based network, with one or more servers and/or computer processors. For example, network 935 may be the Internet or a network connected to the Internet. The network 135 may be a satellite or cellular based network. Information and data may be exchanged through the network 935 between the various components of the system 900. In alternative embodiments, the network 935 may be a local area network within the financial institution that may be connected to or interface with the Internet. It should be appreciated that the network 935 may be a combination of local area networks, wide area networks, and external networks, which may be connected to the Internet.

The server 940 may be communicatively coupled to the network 935. The server 940 may perform operations associated with the establishment, configuration, and application of the automobile buying and financing program described above accordingly to exemplary embodiments. The server 940 may consist of one or more servers and/or general purpose computers, each having one or more computer processors associated therewith.

The server 940 may have a database 950 communicatively coupled thereto. The database 950 may contain data and information used by the system 900. For example, the database 950 may store customer data, financing information, dealer information, and other information associated with the automobile buying and financing program described above. Additional information may be contained therein related to the operation and administration of the system 900.

The database 950 may include any suitable data structure to maintain the information and allow access and retrieval of the information. For example, the database may keep the data in an organized fashion. The database 950 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 950 may be stored in any suitable storage device. The storage device may include multiple data storage devices. The multiple data storage devices may be operatively associated with the database 950. The storage may be local, remote, or a combination thereof with respect to the database. The database 950 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIF S), network attached storage (NAS), or a network file system (NFS). The database may have back-up capability built-in. Communications with the database 950 may be over a network 935, or communications may be over a direct connection between the database 950 and the server 940, as depicted in FIG. 9. Data may be transmitted and/or received from the database 950. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

The system 900 may have other systems 960 associated therewith. These other systems 960 may include external systems, such as third party car buying services described above. The other systems 960 may include equipment and other assets of the entity. The other systems 960 may be associated with third party entities and be external to the server 940.

The system 900 may have other systems 970 associated therewith. In various embodiments, the other systems 970 may include other systems associated with the financial institution. These other systems may include systems associated with loans and financing in support of the automobile buying method described above. These other systems may be separate from and external to the server 940. The other systems 970 may be communicatively coupled to the server 940 through one or more networks that are internal to the financial institution. While the other systems 970 are depicted as being communicatively coupled to the server 940, the other systems 970 may be communicatively coupled through the network 935 to the server 940.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

We claim:

1. A system, comprising:
    a financial institution backend;
    a dealer server comprising at least one computer processor and a tangibly disposed memory; and
    a plurality of dealer electronic devices in communication with the dealer server;
    the dealer server being configured to:
        receive, over a network and from the financial institution backend, pre-approval for an automobile loan for a user, and loan documentation for the automobile loan;
        present, on one of a plurality of dealer electronic devices, the loan documentation to the user;
        receive, from the dealer electronic device, acceptance from the user of the loan documentation; and
        communicate, over the network, the accepted loan documentation to the financial institution backend.

2. The system of claim 1, wherein the dealer server is further configured to:
    receive, from the dealer electronic device, a modification to a term of the automobile loan;

communicate, over the network, the modification to the financial institution backend; and receive, over the network and from the financial institution backend, approval for the modification and revised loan documentation.

3. The system of claim 1, wherein the financial institution backend is configured to fund the automobile loan in response to receiving acceptance of the loan documentation.

4. The system of claim 1, wherein the financial institution backend is configured to provide the user a guaranteed price savings for the automobile upon selection of a dealer.

5. The system of claim 1, wherein the automobile is at least one of a new car and a used car.

6. The system of claim 1, further comprising:
a user electronic device executing a mobile application that is configured to receive user information and to provide the user information to the financial institution, and the financial institution is configured to provide the pre-approval in response to receiving the user information.

7. The system of claim 1, wherein the dealer server further receives a selection of the automobile.

8. The system of claim 1, wherein the pre-approval specifies a loan amount, a specific loan term, and a fixed interest rate.

9. A non-transitory computer readable storage medium, including instructions stored thereon, which when read and executed by one or more computer processors, cause the one or more computer processors to perform steps comprising:
receiving, over a network and from a financial institution backend, pre-approval for an automobile loan for a user, and loan documentation for the automobile loan,
presenting, on one of a plurality of dealer electronic devices, the pre-approved loan documentation to the user;
receiving, from the dealer electronic device, acceptance from the user of the loan documentation; and
communicating, over the network, the accepted loan documentation to the financial institution backend.

10. The non-transitory computer readable storage medium of claim 9, further including instructions stored thereon, which when read and executed by one or more computer processors, cause the one or more computer processors to perform steps comprising:
receiving, from the dealer electronic device, a modification to a term of the automobile loan;
communicating, over the network, the modification to the financial institution backend; and
receiving, over the network and from the financial institution backend, approval for the modification and revised loan documentation.

11. The non-transitory computer readable storage medium of claim 9, further including instructions stored thereon, which when read and executed by one or more computer processors, cause the one or more computer processors to fund the automobile loan in response to receiving acceptance of the loan documentation.

12. The non-transitory computer readable storage medium of claim 9, further including instructions stored thereon, which when read and executed by one or more computer processors, cause the one or more computer processors to provide the user a guaranteed price savings for the automobile upon selection of a dealer.

13. The non-transitory computer readable storage medium of claim 9, further including instructions stored thereon, which when read and executed by one or more computer processors, cause the one or more computer processors to receive user information and to provide the pre-approval in response to receiving the user information.

14. The non-transitory computer readable storage medium of claim 9, further including instructions stored thereon, which when read and executed by one or more computer processors, cause the one or more computer processors to receive a selection of the automobile.

15. The non-transitory computer readable storage medium of claim 9, wherein the pre-approval specifies a loan amount, a specific loan term, and a fixed interest rate.

16. A method, comprising:
receiving, by a dealer server comprising at least one computer processor and a tangibly disposed memory, over a network and from a financial institution backend, pre-approval for an automobile loan for a user, and loan documentation for the automobile loan;
presenting, by the dealer server and on one of a plurality of dealer electronic devices, the loan documentation to the user;
receiving, by the dealer server and from the dealer electronic device, acceptance from the user of the loan documentation; and
communicating, by the dealer server and over the network, the accepted loan documentation to the financial institution backend.

17. The method of claim 16, further comprising:
receiving, by the dealer server and from the dealer electronic device, a modification to a term of the automobile loan;
communicate, by the dealer server and over the network, the modification to the financial institution backend; and
receive, by the dealer server, over the network, and from the financial institution backend, approval for the modification and revised loan documentation.

18. The method of claim 16, further comprising:
receiving, by the dealer electronic device and from a user electronic device executing a mobile application, user information;
receiving, by the dealer server and from the dealer electronic device, the user information; and
communicating, by the dealer server and to the financial institution backend, the user information;
wherein the financial institution backend is configured to provide the pre-approval in response to receiving the user information.

19. The method of claim 16, wherein the dealer server further receives a selection of the automobile.

20. The method of claim 16, wherein the pre-approval specifies a loan amount, a specific loan term, and a fixed interest rate.

* * * * *